US012784718B2

(12) United States Patent
Maruyama

(10) Patent No.: US 12,784,718 B2
(45) Date of Patent: Nov. 3, 2026

(54) INFORMATION PROCESSING SYSTEM, KEYBOARD MUSICAL INSTRUMENT, AND INFORMATION PROCESSING METHOD

(71) Applicant: YAMAHA CORPORATION, Hamamatsu (JP)

(72) Inventor: Tsuyoshi Maruyama, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 1069 days.

(21) Appl. No.: 17/747,394

(22) Filed: May 18, 2022

(65) Prior Publication Data

US 2022/0277714 A1 Sep. 1, 2022

Related U.S. Application Data

(63) Continuation of application No. PCT/JP2020/042703, filed on Nov. 17, 2020.

(Continued)

(51) Int. Cl.
*G10H 1/00* (2006.01)
*G10H 1/34* (2006.01)

(52) U.S. Cl.
CPC ........... *G10H 1/0008* (2013.01); *G10H 1/344* (2013.01); *G10H 2210/066* (2013.01); *G10H 2210/571* (2013.01); *G10H 2220/221* (2013.01)

(58) Field of Classification Search
CPC ................. G10H 1/0008; G10H 1/344; G10H 2210/066; G10H 2210/571; G10H 2220/221
See application file for complete search history.

(56) References Cited

U.S. PATENT DOCUMENTS 3,708,602 A * 1/1973 Hiyama ................. G10H 1/383 84/699
4,519,286 A * 5/1985 Hall ......................... G10H 1/36 84/613

(Continued)

FOREIGN PATENT DOCUMENTS

CN 1577487 A 2/2005
JP H05257477 A 10/1993

(Continued)

OTHER PUBLICATIONS

English translation of Written Opinion issued in Intl. Appln. No. PCT/JP2020/042703 mailed on Feb. 16, 2021, previously cited in IDS filed May 18, 2022.

(Continued)

*Primary Examiner* — Jianchun Qin
(74) *Attorney, Agent, or Firm* — ROSSI, KIMMS & McDOWELL LLP

(57) ABSTRACT

An information processing system acquires a detection signal corresponding to each manipulated operator, among the plurality of operators, that has been manipulated by a user and identifies a manipulation amount or intensity of each of the plurality of operators based on the acquired detection signal. The system further identifies a chord that corresponds, from among the plurality of operators, to a combination of detected two or more manipulated operators. The identifying of the chord includes determining a root note pitch included in the chord based on the manipulation amount or intensity of each of the detected two or more manipulated operators.

12 Claims, 7 Drawing Sheets

Related U.S. Application Data

(60) Provisional application No. 62/937,799, filed on Nov. 20, 2019.

(56) References Cited

U.S. PATENT DOCUMENTS

| | | | | |
|---|---|---|---|---|
| 6,057,502 | A | 5/2000 | Fujishima | |
| 6,177,625 | B1 | 1/2001 | Ito et al. | |
| 7,420,114 | B1 * | 9/2008 | Vandervoort | G10H 1/386 84/613 |
| 10,818,279 | B1 * | 10/2020 | Swanson | G10H 1/386 |
| 2002/0189425 | A1 * | 12/2002 | Hiratsuka | G09B 15/02 84/477 R |
| 2005/0016369 | A1 | 1/2005 | Sunako | |
| 2008/0034947 | A1 | 2/2008 | Sumita | |
| 2010/0170382 | A1 | 7/2010 | Kobayashi | |
| 2017/0025115 | A1 * | 1/2017 | Tachibana | G10L 13/0335 |

FOREIGN PATENT DOCUMENTS

| | | | | |
|---|---|---|---|---|
| JP | 2008040283 | A | | 2/2008 |
| JP | 2009282464 | A | * | 12/2009 |
| JP | 2012098480 | A | | 5/2012 |
| JP | 2015031738 | A | | 2/2015 |
| JP | 2016180795 | A | * | 10/2016 |

OTHER PUBLICATIONS

Office Action issued in Chinese Application No. 202080078315.1, mailed on Jan. 22, 2025. English machine translation provided.

Office Action issued in Indian Application No. 202247034943, mailed on Feb. 18, 2025.

Extended European search report issued in European Appln. No. 20890252.8, mailed Dec. 7, 2023.

Queiroz et al. "Obtaining General Chord Types from Chroma Vectors" XP058074985. Oct. 7, 2015, pp. 1-6.

International Search Report issued in Intl. Appln. No. PCT/JP2020/042703 mailed Feb. 16, 2021. English translation provided.

Written Opinion issued in Intl. Appln. No. PCT/JP2020/042703 mailed Feb. 16, 2021.

Office Action issued in Indian Appln. No. 202247034943 mailed on Sep. 28, 2022.

Office Action issued in Chinese Appln. No. 202080078315.1 mailed on Aug. 27, 2025.

Communication pursuant to Article 94(3) EPC issued in European Appln. No. 20 890 252.8 mailed Nov. 14, 2025.

* cited by examiner

| CHORD NAME | CONSTITUENT NOTE PITCHES | ROOT NOTE PITCH |
|---|---|---|
| C | C, E, G | C |
| Em(+5) | C, E, G | E |
| G6sus4 | C, E, G | G |
| ⋮ | ⋮ | ⋮ |

T

INFORMATION PROCESSING SYSTEM, KEYBOARD MUSICAL INSTRUMENT, AND INFORMATION PROCESSING METHOD

CROSS REFERENCE TO RELATED APPLICATIONS

This application is a Continuation Application of PCT Application No. PCT/JP2020/042703, filed Nov. 17, 2020, and is based on and claims priority from U.S. Provisional Application Ser. No. 62/937,799, filed Nov. 20, 2019, the entire contents of each of which are incorporated herein by reference.

BACKGROUND

Technical Field

The present disclosure relates to a technique for identifying chords consisting of multiple different note pitches.

Background Information

Conventionally there is known in the art technologies for identifying chords based on a result of a user playing a musical instrument. For example, Japanese Patent Application Laid-Open Publication No. 2015-31738 discloses a configuration by which chords are identified based on playing information that is representative of a user's playing.

For example, chord inversions have in common a combination of note pitches, but the root note pitch of an inversion may be different. Using conventional technology, it is difficult to accurately identify chords distinguished by their root note pitches.

SUMMARY

In view of the foregoing, one of the objects according to one aspect of the present disclosure is to accurately identify chords by taking into account differences in root note pitches.

In order to solve the above problem, an information processing system according to one aspect of the present disclosure is an information processing system for a musical instrument including a plurality of operators each corresponding to a different note pitch and includes: one or more memories storing instructions; and one or more processors communicatively connected to the one or more memories and that execute the stored instructions to: acquire a detection signal corresponding to each manipulated operator, among the plurality of operators, that has been manipulated by a user; identify a manipulation amount or intensity of each of the plurality of operators based on the acquired detection signal; and identify a chord that corresponds, from among the plurality of operators, to a combination of detected two or more manipulated operators, the identifying of the chord including determining a root note pitch included in the chord based on the manipulation amount or intensity of each of the detected two or more manipulated operators.

A keyboard musical instrument according to one aspect of the present disclosure has a music keyboard that includes a plurality of keys each corresponding to a different note pitch; one or more memories storing instructions; and one or more processors communicatively connected to the one or more memories and that execute the stored instructions to: acquire a detection signal corresponding to each manipulated key, among the plurality of keys, that has been manipulated by a user; identify a manipulation amount or intensity of each of the plurality of keys based on the acquired detection signal; cause a playback device to play a music sound of a note pitch corresponding to, from among the plurality of keys, each detected manipulated key; and identify a chord that corresponds, from among the plurality of keys, to a combination of detected two or more manipulated keys, the identifying of the chord including determining a root note pitch included in the chord based on the manipulation amount or intensity of each of the detected two or more manipulated keys.

An information processing method according to one aspect of the present disclosure is a computer-implemented information processing method for a musical instrument including a plurality of operators each corresponding to a different note pitch. The method identifies a manipulation amount or intensity, of each of the plurality of operators based on a detection signal corresponding to, among the plurality of operators, that has been manipulated by a user; and identifies a chord that corresponds, from among the plurality of operators, to a combination of detected two or more manipulated operators, the identifying of the chord including determining a root note pitch included in the chord based on the manipulation amount or intensity of each of the detected two or more manipulated operators.

DETAILED DESCRIPTION

A: First Embodiment

Figure 1:
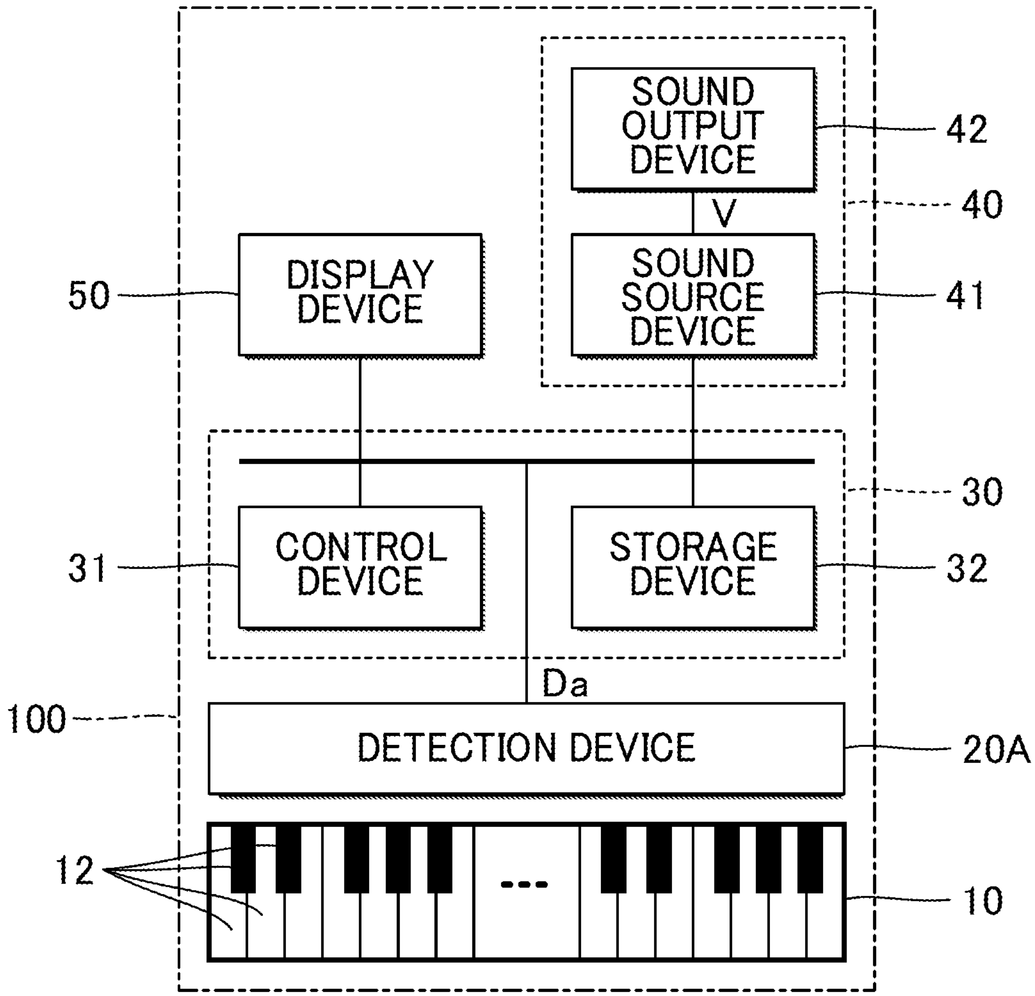
FIG. 1 is a block diagram showing an example configuration of a keyboard musical instrument in a first embodiment.

FIG. 1 is a block diagram illustrating a configuration of a keyboard musical instrument 100 according to a first embodiment of the present disclosure. The keyboard musical instrument 100 is an electronic musical instrument that produces music sounds when played by a user. The keyboard musical instrument 100 includes a music keyboard 10, a detection device 20A, an information processing system 30, a playback device 40, and a display device 50.

The music keyboard 10 consists of a plurality of keys 12 each of which corresponds to a different note pitch. The plurality of keys 12 is arranged in a transverse direction relative to a user who plays the keyboard musical instrument 100, and includes both white keys and black keys. Each of the plurality of keys 12 is an operator that is displaceable responsive to manipulation (depressing or releasing) by the user.

Figure 2:
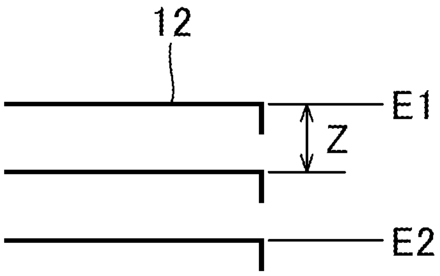
FIG. 2 is an explanatory diagram of key displacement.

FIG. 2 is an explanatory diagram of displacement of a key 12. Each key 12 is displaced in a vertical direction between a start position E1 and an end position E2 upon manipulation by the user. The start position E1 is an upper surface position of a key 12 in a released state when the user's finger is not in contact with the key 12. The end position E2 is an upper surface position of a key 12 in a depressed state when the user fully depresses the key 12. The user can manipulate a key 12 to reside at any position between the start position E1 and the end position E2.

The detection device 20A in FIG. 1 detects displacement of each of the plurality of keys 12. Specifically, the detection device 20A generates a detection signal Da with a signal level corresponding to a position of the key 12 in a vertical direction. The detection signal Da is an electrical signal, a level of which changes in either a stepwise or a continuous manner in response to movement of the key 12 in the vertical direction. For example, the detection device 20A is a magnetic sensor that utilizes a change in a magnetic field associated with movement of a key 12 to generate a detection signal Da, or is an optical sensor that utilizes a change in an amount of received light associated with movement of a key 12 to generate a detection signal Da. The configuration and method of the detection device 20A for detection of displacement of each the plurality of keys 12 is not limited to the above examples.

The information processing system 30 identifies chords played by the user (hereinafter, "played chords"). A played chord consists of a combination of a plurality of pitches, a sound of each of which is produced simultaneously with each other. The information processing system 30 identifies a played chord by analyzing the detection signal Da. Identification of a played chord by the information processing system 30 is carried out in conjunction with the playing by the user. The information processing system 30 is realized by a computer system that includes a control device 31 and a storage device 32.

The control device 31 consists of one or more processors that control respective elements of the keyboard musical instrument 100. For example, the control device 31 comprises one or more of types of a Central Processing Unit (CPU), a Sound Processing Unit (SPU), a Digital Signal Processor (DSP), a Field Programmable Gate Array (FPGA), and an Application Specific Integrated Circuit (ASIC).

The storage device 32 comprises either a single or multiple memories that store programs for execution by the control device 31 and data for use by the control device 31. The storage device 32 comprises a known recording medium such as a magnetic recording medium or a semiconductor recording medium. The storage device 32 may comprise a combination of multiple types of storage media. In addition, the storage device 32 may comprise a portable recording medium that is detachable from the keyboard musical instrument 100, or an external recording medium (e.g., online storage) with which the keyboard musical instrument 100 is communicable.

Under control of the control device 31, the playback device 40 plays music sounds responsive to manipulation of the music keyboard 10 by the user. Specifically, the playback device 40 has a sound source device 41 and a sound output device 42. The playback device 40 may be mounted to the information processing system 30, or may be configured as a separate device from the information processing system 30.

The sound source device 41 generates an audio signal V representative of a waveform of a music sound responsive to manipulation of the music keyboard 10 by the user. Specifically, there is generated an audio signal V representative of a music sound of a pitch that corresponds to a key 12 that is depressed by the user among the plurality of keys 12. The sound output device 42 outputs the music sound represented by the audio signal V. A loudspeaker or headphones can be used as the sound output device 42. The functions of the sound source device 41 may be realized by execution of a program stored in the storage device 32 by the control device 31 (i.e., a software sound source).

The display device 50 displays images under control of the control device 31. A display panel, such as a liquid crystal display panel or an organic EL display panel, is used as the display device 50. The display device 50 of the first embodiment displays a chord name of a played chord identified by the control device 31. The display device 50 may be mounted to the information processing system 30, or may be configured as a separate device from the information processing system 30.

Figures 3, 4:
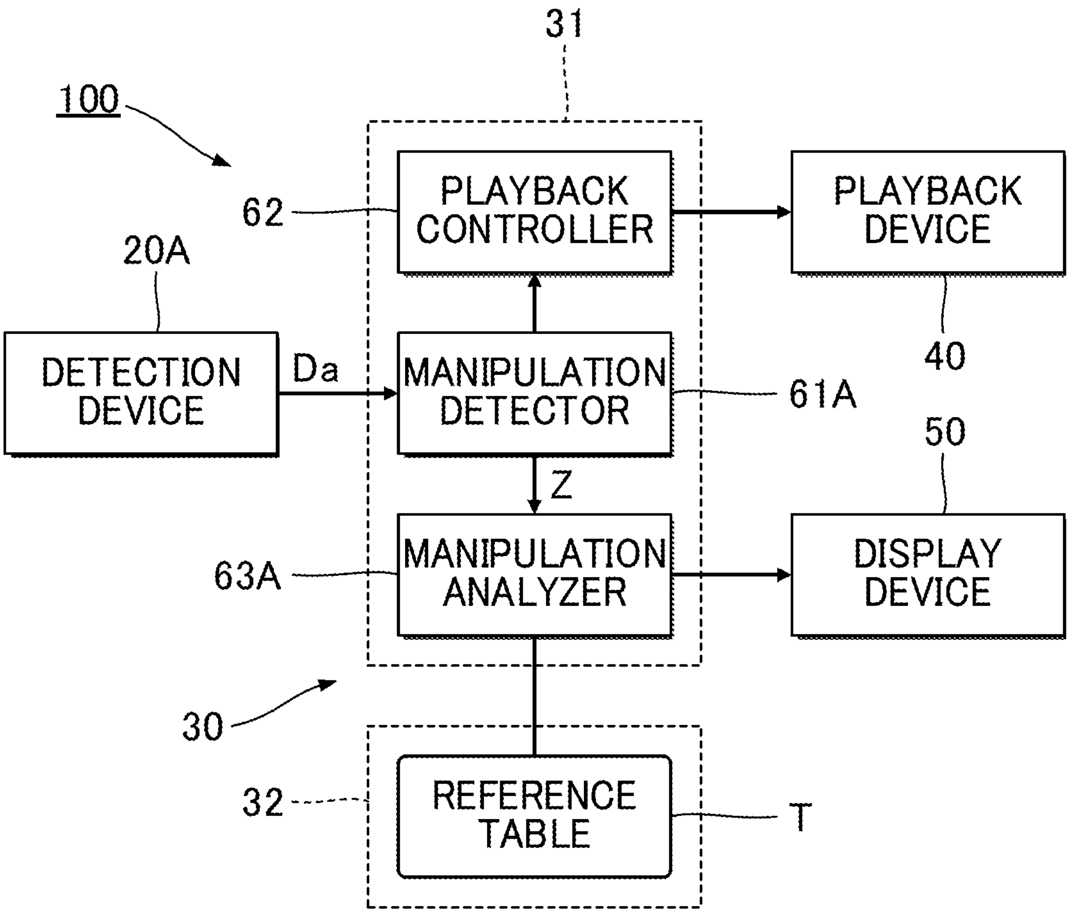
FIG. 3 is a block diagram showing an example functional configuration of the keyboard musical instrument.
FIG. 4 is a schematic diagram of a reference table.

FIG. 3 is a block diagram showing a functional configuration of the information processing system 30. By execution of the program stored in the storage device 32, the control device 31 realizes multiple functions (a manipulation detector 61A, a playback controller 62, and a manipulation analyzer 63A) for analyzing manipulation of the music keyboard 10 by the user.

The manipulation detector 61A detects manipulations by a user of each of the plurality of keys 12. Specifically, the manipulation detector 61A identifies a manipulation amount Z of a key 12 by analyzing a detection signal Da generated by the detection device 20A. As shown in FIG. 2, the manipulation amount Z is the amount of displacement of the key 12 caused by manipulation by the user. Specifically, as illustrated in FIG. 2, the manipulation amount Z is the amount of displacement of the key 12 relative to the start position E1. In other words, a depth to which the key 12 is depressed by the user is identified as the manipulation amount Z. Further, the manipulation detector 61A detects whether a key 12 has been manipulated based on a manipulation amount Z of the key 12. Specifically, when the manipulation amount Z of the key 12 is detected as exceeding a predetermined threshold, the manipulation detector 61A determines that the key 12 has been manipulated by the user.

The playback controller 62 in FIG. 3 controls playback of music sounds by the playback device 40. Specifically, the playback controller 62 causes the playback device 40 to play a music sound of a note pitch that corresponds to a key 12, manipulation of which is detected by the manipulation detector 61A from among the plurality of keys 12 constituting the music keyboard 10.

The manipulation analyzer 63A identifies a chord played by the user by manipulation of the music keyboard 10. The manipulation analyzer 63A utilizes a result of the detection by the manipulation detector 61A, to identify the chord played. Specifically, a reference table T stored in the storage device 32 is utilized by the manipulation analyzer 63A to identify a played chord.

FIG. 4 is a schematic diagram of the reference table T. The reference table T is a data table in which a chord name together with constituent note pitches and a root note pitch are registered for chords each of which are played chord candidates. Each chord name is represented by one or more characters, and each chord consists of a combination of different note pitches. The root note pitch of each chord is a note pitch among note pitches that constitute the chord. For example, the root note pitch of a chord is the lowest pitched note among the note pitches that constitute the chord.

By referring to the reference table T, the manipulation analyzer 63A in FIG. 3 identifies a played chord that corresponds to a combination of a plurality of keys 12, manipulation of which is detected by the manipulation detector 61A. Specifically, from among the plurality of chords registered in the reference table T, the manipulation analyzer 63A identifies, as a played chords, a chord that consists of a plurality of note pitches corresponding to keys 12, manipulation of which are detected by the manipulation detector 61A.

However, for example, inverted chords while having in common a combination of note pitches, have a different root note pitch. Consequently it may not be possible to identify a chord played by the user from a combination of note pitches alone. In view of the foregoing, the manipulation analyzer 63A identifies the root note pitch of the played chord from among the combination of note pitches of the played chord.

When a user plays a chord, there is a tendency for the user to manipulate one key 12 corresponding to the root note pitch of the chord more strongly than for one or more keys corresponding to other note pitches that constitute the chord. Accordingly, there is a tendency among a plurality of keys 12 manipulated by the user, for a manipulation amount Z of a key 12 that corresponds to the root note pitch of the chord to exceed a manipulation amount Z of the one or more other keys 12 that correspond to the other note pitches of the chord.

Taking into account this tendency, the manipulation analyzer 63A of the first embodiment identifies a root note pitch of a played chord based on a manipulation amount Z of each of a plurality of keys 12. More specifically, the manipulation analyzer 63A identifies, as the root note pitch, a note pitch that corresponds to one key 12 with a greatest manipulation amount Z from among the plurality of keys 12 manipulated by the user. The manipulation analyzer 63A then identifies a chord that includes the root note pitch as the played chord. As will be understood from the above description, the manipulation analyzer 63A of the first embodiment identifies a chord that corresponds to the combination of the plurality of keys 12, manipulation of which is detected by the manipulation detector 61A, and identifies as the played chord a chord that includes a root note pitch that is identified based on manipulation amounts Z of the respective plurality of keys 12. Further, the manipulation analyzer 63A displays on the display device 50 a chord name that is registered in the reference table T for the played chord.

Figure 5:
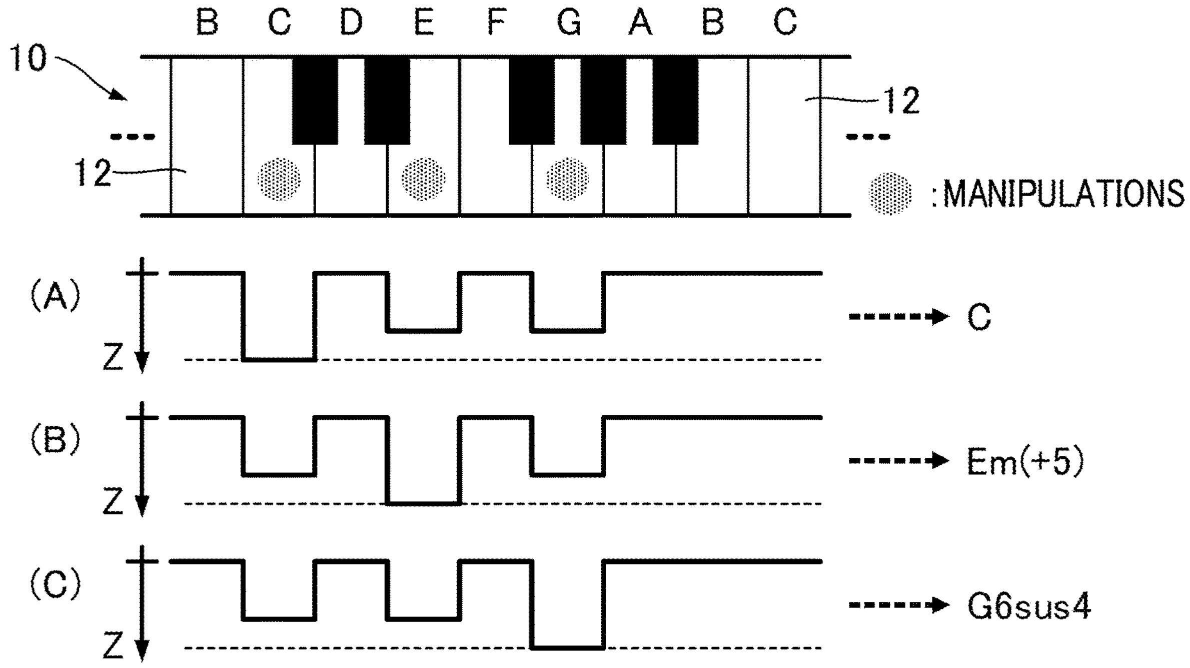
FIG. 5 is an explanatory diagram of a method of identifying a chord.

FIG. 5 is an example operation in which the manipulation analyzer 63A identifies the played chord. In examples A through C of FIG. 5, it is assumed that the user operates three keys 12 corresponding to the note pitches "C (do)," "E (mi)", and "G (so)." Chords that contain these three example note pitches as constituent note pitches are respectively "C," "Em(+5)," and "G6sus4."

In example A, of the three keys 12 manipulated by the user, the manipulation amount Z of the key 12 corresponding to the note pitch "C" is greater than the manipulation amounts Z of the keys 12 corresponding to the note pitches "E" and "G." Accordingly, the manipulation analyzer 63A identifies the note pitch "C" as the root note pitch, and identifies the played chord as "C," with a root note pitch "C."

In example B, of the three keys 12 manipulated by the user, the manipulation amount Z of the key 12 corresponding to the note pitch "E" is greater than the manipulation amounts Z of the keys 12 corresponding to the note pitches "C" and "G." Therefore, the manipulation analyzer 63A identifies the note pitch "E" as the root note and identifies the played chord as "Em(+5)," with a root note pitch "E."

In example C, of the three keys 12 manipulated by the user, the manipulation amount Z of the key 12 corresponding to the note pitch "G" is greater than the manipulation amounts Z of the keys 12 corresponding to the note pitches "C" and "E." Therefore, the manipulation analyzer 63A identifies the note pitch "G" as the root note pitch and identifies the played chord as "G6sus4" with a root note pitch "G."

Figure 6:
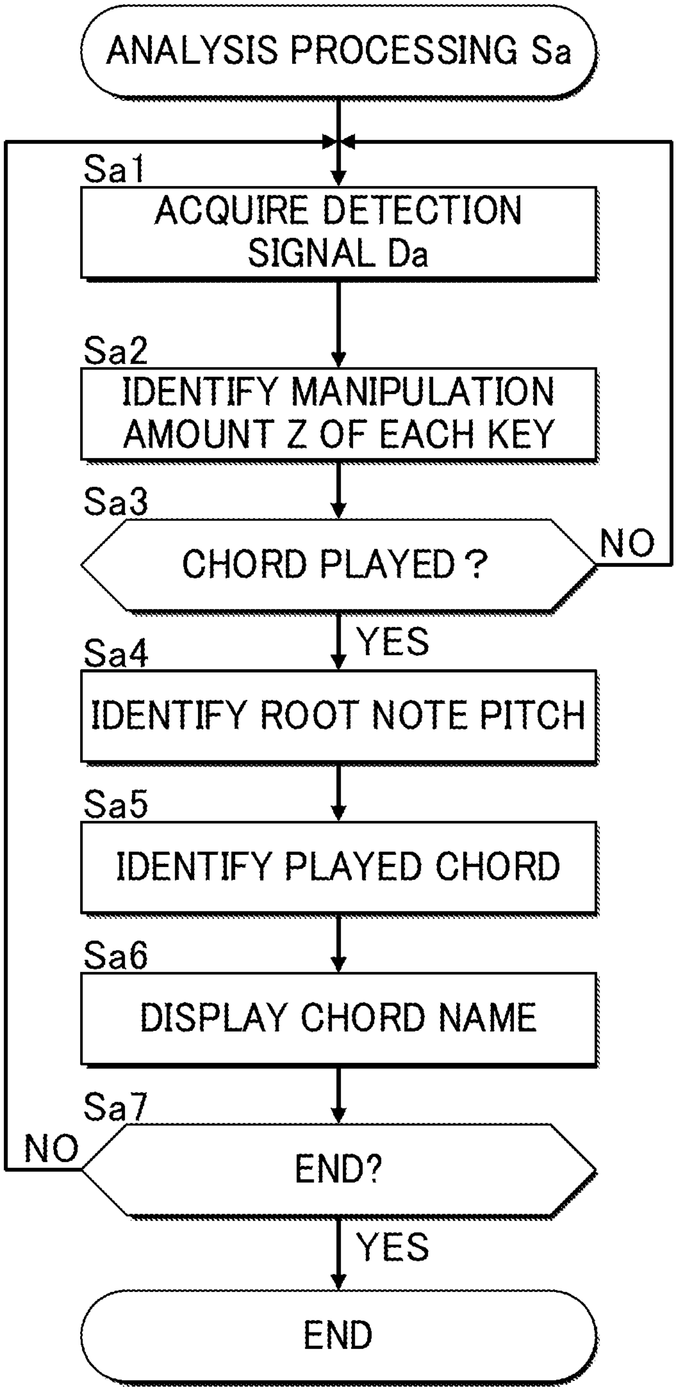
FIG. 6 is a flowchart showing example steps of analysis processing.

FIG. 6 is a flowchart illustrating an example procedure of processing Sa (hereinafter, "analysis processing") executed by the control device 31. For example, the analysis processing Sa is initiated by an instruction from a user.

Upon start of the analysis processing Sa, the manipulation detector 61A acquires a detection signal Da supplied from the detection device 20A (Sa1). The manipulation detector 61A identifies the manipulation amount Z of each of the plurality of keys 12 by analyzing the detection signal Da (Sa2). Thus, the manipulation detector 61A detects a manipulation by the user of each of the plurality of keys 12. The manipulation detector 61A determines whether the user has played a chord (Sa3). For example, the manipulation detector 61A determines whether the manipulation amounts Z of two or more keys 12 exceeds a threshold value. The manipulation detector 61A determines that the user has played a chord when the manipulation amounts Z of two or more keys 12 exceed the threshold value (Sa3: YES), and determines that the user has not played a chord when the manipulation amount Z exceeds the threshold value for one or less keys 12 (Sa3: NO). The manipulation detector 61A repeats acquisition of a detection signal Da (Sa1) and identification of a manipulation amount Z of the respective key 12 (Sa2) until the user plays a chord (Sa3: NO). The playback controller 62 causes the playback device 40 to play a music sound of a note pitch corresponding to a key 12 manipulated by the user.

When the user plays a chord (Sa3: YES), the manipulation analyzer 63A identifies a root note pitch of the chord played by the user (Sa4). Specifically, the manipulation analyzer 63A identifies as the root note pitch a note pitch that corresponds to a single key 12, a manipulation amount Z of which is the greatest among the plurality of keys 12, manipulation of which are detected by the manipulation detector 61A.

The manipulation analyzer 63A identifies as a played chord a chord that corresponds to a combination of the plurality of keys 12 manipulated by the user and that includes the root note pitch identified based on the manipulation amounts Z (Sa5). Specifically, the manipulation analyzer 63A searches the reference table T for two or more chords each consisting of the plurality of note pitches played by the user, and identifies a chord that includes the root note pitch identified at Step Sa4 from among the two or more chords. The manipulation analyzer 63A displays a chord name registered in the reference table T as the played chord on the display device 50 (Sa6).

The control device 31 determines whether a predetermined end condition has been met (Sa7). The end condition is, for example, a condition that the end is instructed by the user, or that playing by the user ends. If the end condition is not met (Sa7: NO), the control device 31 proceeds to Step Sa1. Thus, until the end condition is met, detection of the manipulation amount Z of each key 12 (Sa1-Sa3), identification of a played chord (Sa4, Sa5), and display of a chord name of the played chord (Sa6) are repeated. When the end condition is met (Sa7: YES), the control device 31 ends the analysis processing Sa.

As described above, in the first embodiment, the root note pitch of the played chord is identified based on the manipulation amount Z of each of the plurality of keys 12, manipulation of which by the user is detected. Thus, compared with a configuration in which a played chord is identified only from a combination of a plurality of keys 12 manipulated by the user, it is possible to accurately identify a chord by taking into account a difference in a root note pitch. In the first embodiment, in particular, a played chord is identified that includes as the root note pitch a note pitch that corresponds to a key 12 with the a greatest manipulation amount Z from among a plurality of keys 12 manipulated by the user. Thus, based on a tendency for a user to more strongly manipulate a key 12 corresponding to a root note pitch of a chord, it is possible to accurately identify a chord with its root note pitch.

B: Second Embodiment

Description will now be given of a second embodiment. In the following embodiment, for elements whose functions are substantially the same as those of the first embodiment, like reference signs used in the description of the first embodiment are used and detailed description thereof is omitted, as appropriate.

Figure 7:
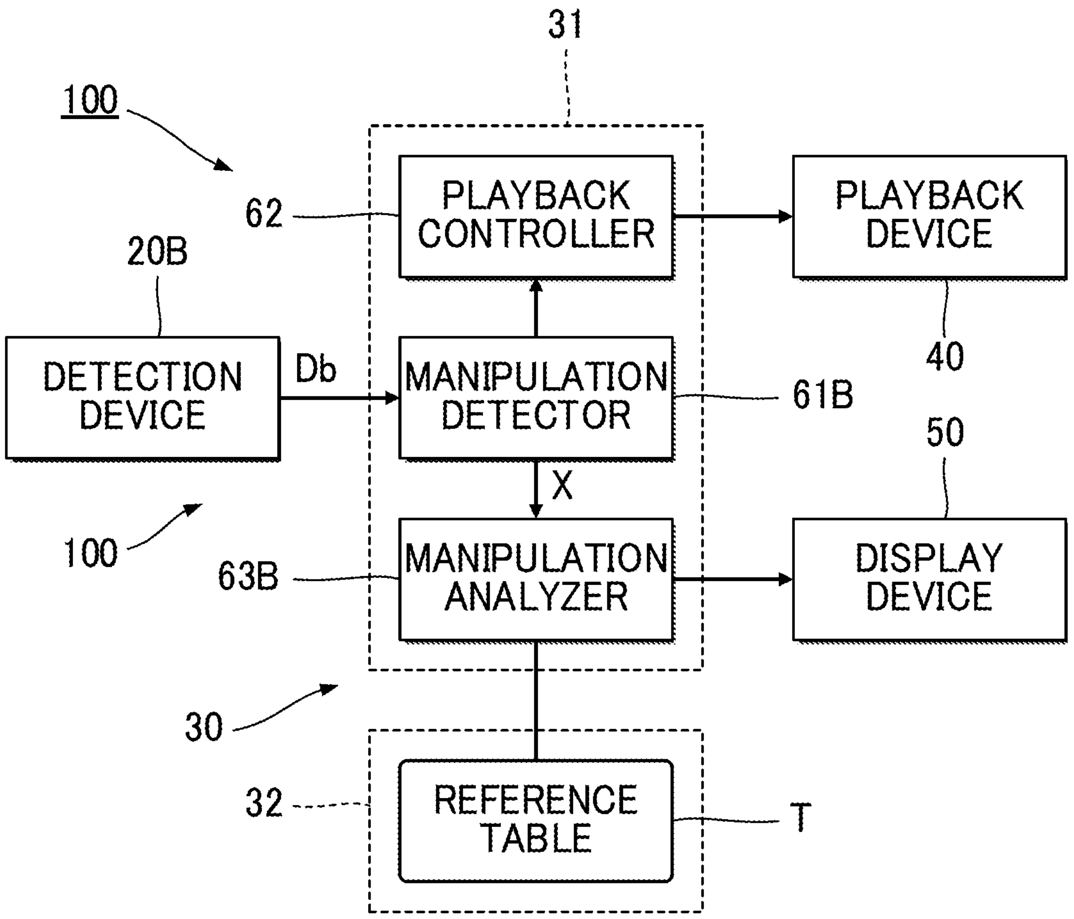
FIG. 7 is a block diagram showing an example functional configuration of a keyboard musical instrument in a second embodiment.

FIG. 7 is a block diagram illustrating a functional configuration of the control device 31 in the second embodiment. As shown in FIG. 7, in the second embodiment, the detection device 20A of the first embodiment is replaced by a detection device 20B. The detection device 20B generates a detection signal Db with a signal level corresponding to an intensity with which the user manipulates a key 12 (manipulation intensity). Specifically, the detection device 20B is a pressure sensor that generates a detection signal Db corresponding to a pressure with which the user presses a key 12.

In the second embodiment, the manipulation detector 61A is replaced by a manipulation detector 61B, and the manipulation analyzer 63A is replaced by a manipulation analyzer 63B. The manipulation detector 61B detects manipulation of each of the plurality of keys 12 by a user. The manipulation detector 61B of the second embodiment detects an intensity X with which a user manipulates a key 12 (hereinafter, "manipulation intensity") by analyzing the detection signal Db generated by the detection device 20B. The manipulation intensity X is, for example, a pressure with which the user depresses a key 12. It is of note that as in the first embodiment the playback controller 62 is configured and operates to cause the playback device 40 to play a music sound of a note pitch corresponding to a key 12, manipulation of which is detected by the manipulation detector 61A.

The manipulation analyzer 63B utilizes a result of the detection by the manipulation detector 61B to identify a played chord. The same reference table T as that in the first embodiment is used to identify the played chord by the manipulation analyzer 63B.

As mentioned above, among a plurality of note pitches that constitute a chord, users tend to manipulate a single key 12 corresponding to the root note pitch of the chord more strongly than the one or more keys 12 corresponding to note pitches other than the root note pitch. Therefore, from among the plurality of keys 12 manipulated by the user, the manipulation intensity X of a single key 12 that corresponds to the root note pitch of a chord played by the user tends to exceed the manipulation intensities X of the one or more keys 12 other than the key 12 corresponding to the root note pitch.

Taking into consideration the above tendency, the manipulation analyzer 63B of the second embodiment identifies the root note pitch of the played chord based on the manipulation intensity X of each of the plurality of keys 12. Specifically, the manipulation analyzer 63B identifies as the root note pitch a pitch note that corresponds to a single key 12 with the highest manipulation intensity X from among the plurality of keys 12 manipulated by the user. The manipulation analyzer 63A then identifies as the played chord a chord that includes the root note pitch. As will be understood from the above description, the manipulation analyzer 63B of the second embodiment identifies a chord that corresponds to a combination of a plurality of keys 12, manipulation of which the manipulation detector 61B detects, and that includes a root note pitch identified based on the manipulation intensities X of the respective plurality of keys 12.

Figure 8:
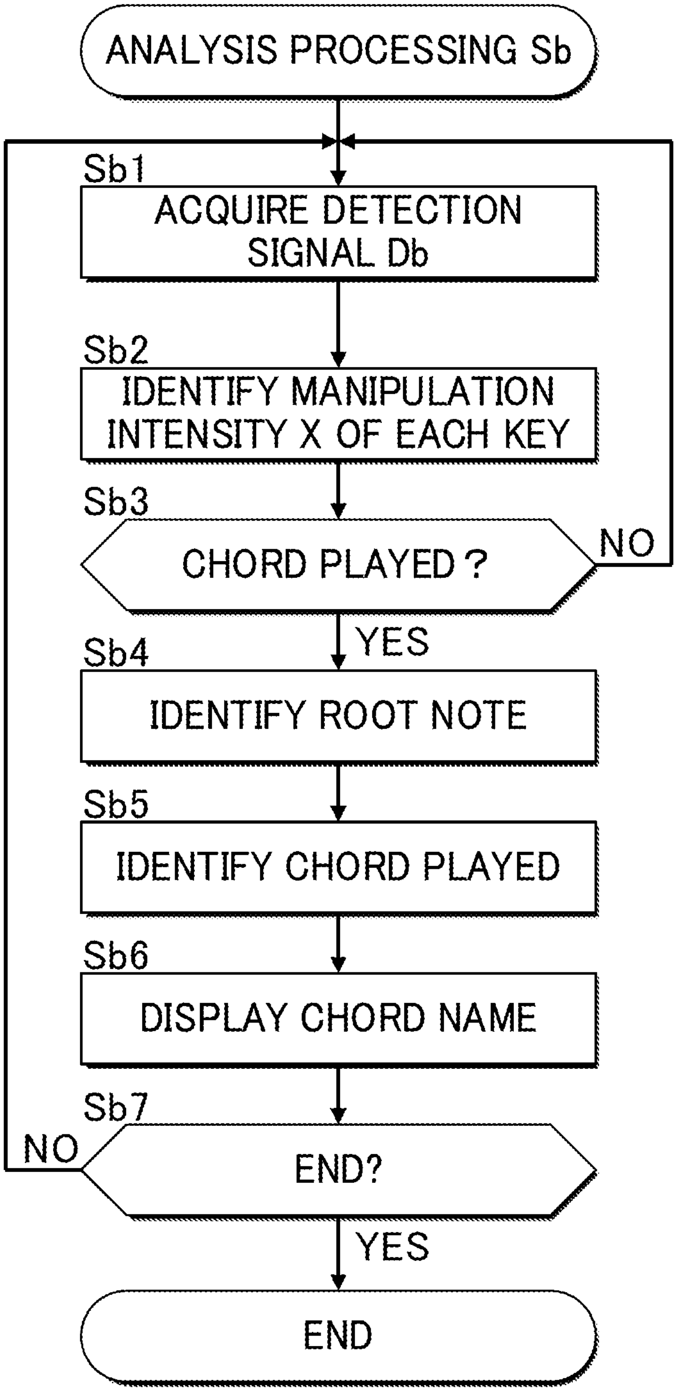
FIG. 8 is a flowchart showing example steps of analysis processing in the second embodiment.

In the second embodiment, analysis processing Sb shown in FIG. 8 is executed in place of the analysis processing Sa in the first embodiment. For example, the analysis processing Sb is initiated by an instruction from the user.

Upon start of the analysis processing Sb, the manipulation detector 61B analyzes a detection signal Db supplied from the detection device 20B to identify a manipulation intensity X of a key 12 (Sb1, Sb2). Thus, the manipulation detector 61B detects manipulation of each of the plurality of keys 12. Similarly to the first embodiment, the manipulation detector 61B determines whether the user has played a chord (Sb3). The manipulation detector 61B repeats the process of identifying the manipulation intensities X of the respective keys 12 (Sb1, Sb2) until the user plays a chord (Sb3: NO).

When the user plays a chord (Sb3: YES), the manipulation analyzer 63B identifies the root note pitch of the chord played by the user (Sb4). Specifically, the manipulation analyzer 63B identifies as the root note pitch a pitch that corresponds to a single key 12 subjected to the highest manipulation intensity X from among a plurality of keys 12, manipulation of which the manipulation detector 61B detects.

The manipulation analyzer 63B identifies as a played chord a chord that corresponds to a combination of the plurality of keys 12 manipulated by the user and that includes the root note pitch identified based on the manipulation intensities X (Sb5). The manipulation analyzer 63B displays on the display device 50 a chord name registered in the reference table T for the played chord, as in the first embodiment (Sb6). The above processes (Sb1-Sb6) are repeated until the predetermined end condition is met (Sb7: YES).

In the second embodiment, the same effects as in the first embodiment are realized. In the second embodiment, a played chord is identified that includes as its root note pitch a note pitch corresponding to a key 12 with a highest manipulation intensity X from among the plurality of keys 12 manipulated by the user. Therefore, under the tendency for the user to more strongly manipulate a key 12 corresponding to the root note pitch of a desired chord, it is possible to accurately identify a chord with a root note pitch.

C: Third Embodiment

Figure 9:
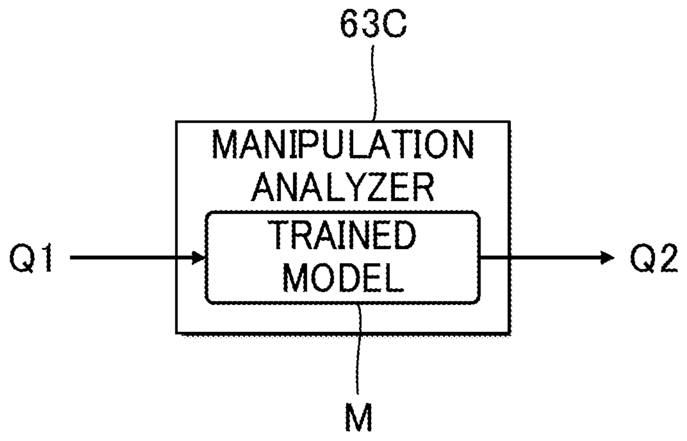
FIG. 9 is an explanatory diagram of a manipulation analyzer in a third embodiment.

In the third embodiment, the manipulation analyzer 63A of the first embodiment is replaced by a manipulation analyzer 63C, as shown in FIG. 9. As described above, the manipulation analyzer 63A in the first embodiment utilizes the reference table T to identify a played chord. The manipulation analyzer 63C in the third embodiment uses a trained model M to identify a played chord.

Specifically, the manipulation analyzer 63C inputs to the trained model M input data Q1 representative of a result of detection by the manipulation detector 61A, to generate output data Q2. The input data Q1 is data representative of a manipulation amount Z identified by the manipulation detector 61A for each of the plurality of keys 12. The output data Q2 is data representative of a played chord.

The trained model M is a statistical estimation model that uses machine learning to learn relationships between manipulation amounts Z of the respective keys 12 and played chords (relationships between input data Q1 and output data Q2). Specifically, the trained model M is constituted of, for example, a deep neural network (DNN). A freely selected form of a neural network, such as, for example, a recurrent neural network (RNN) or a convolutional neural network (CNN), can be used as the trained model M. An additional element, such as Long Short-Term Memory (LSTM), may also be incorporated into the trained model M. A recognition model, such as Hidden Markov Model (HMM) or Support Vector Machine (SVM), can also be used as the trained model M.

The trained model M is realized by a combination of a program and multiple variables (specifically, weighting values and biases), the program causing the control device 31 to perform a calculation to generate output data Q2 from input data Q1, with the variables being applied to the calculation. The program and the variables used to realize the trained model M are stored in the storage device 32. The numerical values of each of the variables are set in advance by machine learning.

Figure 10:
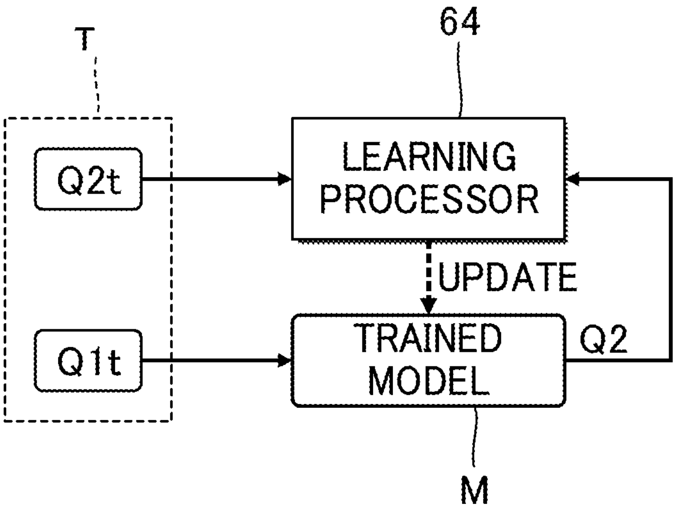
FIG. 10 is an explanatory diagram of trained model machine learning.

FIG. 10 is an explanatory diagram of machine learning of the trained model M. In FIG. 10 the control device 31 functions as a learning processor 64 by executing the program stored in the storage device 32. The learning processor 64 establishes the trained model M by supervised machine learning using a plurality of sets of training data T. The plurality of sets of training data T is stored in the storage device 32. It is of note that the trained model M may be established by machine learning by use of a machine learning system separate from the keyboard musical instrument 100, and the trained model M then may be transferred to the keyboard musical instrument 100.

Each set of the plurality of sets of training data T consists of a combination of input data Q1$t$ and output data Q2$t$. The output data Q2$t$ is data representative of a played chord. The input data Q1$t$ in each set of training data T specifies a combination of a plurality of keys 12 corresponding to the played chord represented by the output data Q2$t$ in the same set of the training data T. In other words, the input data Q1$t$ specifies a combination of the plurality of keys 12 manipulated when the chord is played. In addition, the input data Q1$t$ specifies the manipulation amounts Z for the respective plurality of keys 12 corresponding to the played chord. Even if the combination of the plurality of keys 12 specified by the input data Q1$t$ is common among a plurality of sets of training data T, if the manipulation amounts Z for the respective keys 12 are different, the played chords represented by the corresponding respective pieces of output data Q2$t$ of the sets of training data T will differ from one another. Specifically, the output data Q2$t$ specifies a played chord with a root note pitch having a pitch that corresponds to the key 12 with the greatest manipulation amount Z from among the plurality of keys 12 represented by the input data Q1$t$.

The learning processor 64 repeatedly updates the variables of the trained model M so that the difference is reduced between output data Q2, which is output by inputting the input data Q1$t$ of each set of training data $\tau$ into an initial or tentative model, and the output data Q2$t$ (ground truth) of the same set of training data $\tau$. For example, backpropagation is used to update a plurality of variables. As will be understood from the above description, the trained model M is based on potential relationships existing between the input data Q1$t$ and the output data Q2$t$ in the plurality of sets of training data $\tau$; and outputs statistically valid output data Q2 in response to supply of unknown input data Q1.

As described above, the played chord indicated by the output data Q2$t$ in each set of training data $\tau$ is a chord that includes a root note pitch identified based on manipulation amounts Z specified by the input data Q1$t$ for the respective keys 12. Therefore, similarly to the manipulation analyzer 63A of the first embodiment, the manipulation analyzer 63C identifies a played chord (output data Q2) that corresponds to a combination of a plurality of keys 12 manipulated by a user and that includes a root note pitch identified based on the manipulation amounts Z of the respective plurality of keys 12. As will be understood from the above description, the same effects as those of the first embodiment are realized in the third embodiment.

It is of note that in the above description, an example is given of a mode in which a played chord is identified based on the manipulation amounts Z of the respective keys 12. However, substantially the same trained model M as that in the third embodiment can also be used in a mode in which a performance chord is identified based on the manipulation intensities X of the respective keys 12 as in the second embodiment. Specifically, each of the input data Q1 and the input data Q1$t$ specifies manipulation intensities X for respective plurality of keys 12. Further, the output data Q2$t$ of each set of training data $\tau$ specifies a played chord with its root note pitch being a note pitch corresponding to a key 12 with the highest manipulation intensity X from among the plurality of keys 12 represented by the input data Q1$t$ of the same set of training data $\tau$. The procedure for machine learning of the trained model M by the learning processor 64 is substantially the same as the procedure described above with reference to FIG. 10. According to the above configuration, as in the second embodiment, a played chord (output data Q2) that corresponds to a combination of a plurality of keys 12 manipulated by the user, and that includes a root note pitch identified based on manipulation intensities X of the respective plurality of keys 12 is identified.

D: Modifications

The following are example modifications additional to each of the above modes. Two or more modes freely selected from the following examples may be combined as appropriate so long as they do not contradict each other.

(1) In each of the above described modes, the chord name of a played chord is displayed on the display device 50. However, a method of using a result of the played chord identification is not limited to the above examples. For example, a time series of played chords analyzed by the manipulation analyzer 63 (63A, 63B or 63C) may be stored in the storage device 32. A configuration is also conceivable by which the playback device 40 is caused to play a music sound corresponding to the played chord identified by the manipulation analyzer 63. For example, the playback controller 62 causes the playback device 40 to play, from among a plurality of accompaniment sounds corresponding to different chords, an accompaniment sound corresponding to a played chord identified by the manipulation analyzer 63. A played chord analyzed by the manipulation analyzer 63 may be transmitted to another information device via a communication network, such as the Internet, for example.

(2) In each of the above modes, the respective keys 12 constituting the music keyboard 10 are examples of operators. However, the specific form of the operators is not limited to the keys 12. Any form of operator that is displaceable responsive to manipulation by a user can be adopted for use in the same manner as the keys 12 in each of the above-described modes. A direction of manipulation detected by the manipulation detector 61 (61A, 61B) is not limited to a vertical direction. For example, the manipulation detector 61 may detect a displacement in rotational directions relative to the operator, such as a pitch direction, yaw direction, or roll direction.

(3) For example, the information processing system 30 may be realized by a server apparatus that communicates with a terminal apparatus, such as a smartphone or tablet device. In such a case, responsive to manipulation by a user of the music keyboard 10 the terminal apparatus transmits a detection signal D (Da, Db) to the information processing system 30 via a communication network, such as the Internet, for example. The information processing system 30 identifies a played chord by analyzing the detection signal D in the same manner as in the above described modes, and transmits the played chord to the terminal apparatus. The terminal apparatus executes various processes, utilizing the played chord received from the information processing system 30.

(4) The functions illustrated above are realized by cooperation of one or more processors constituting the control device 31 and a program stored in the storage device 32, as described above. The program of the present disclosure can be provided in a form stored on a computer-readable recording media for installation in a computer. The recording media are for example non-transitory recording media, a good example of which is optical recording media (optical discs), such as CD-ROMs, but any known form of recording media, such as semiconductor recording media or magnetic recording media, are also included. The non-transitory recording media include any recording media except transitory propagating signals, but volatile recording media are not excluded. In a configuration where a distribution apparatus delivers a program via a communication network, a storage device that stores the program in the distribution apparatus corresponds to the above non-transitory recording medium.

E: Appendix

From the modes illustrated above, the following configurations are derivable for example.

An information processing system according to one aspect of the present disclosure (Aspect 1) includes a manipulation detector configured to detect manipulation, by a user, of each of a plurality of operators each of which corresponds to a different note pitch; and a manipulation analyzer configured to identify a chord that corresponds, from among the plurality of operators, to a combination of two or more operators, manipulation of which is detected, the chord including a root note pitch that is determined based on a manipulation amount or a manipulation intensity of each of the two or more operators. In the above aspect, the root note pitch of a chord is distinguished based on a detected manipulation amount or a manipulation intensity by the user of each of the two or more operators. Therefore, compared with a configuration in which a played chord is identified based only on a combination of two or more operators, manipulation of which by the user is detected, it is possible to accurately identify a played chord by taking into account a difference in a root note pitch.

An "operator" is, for example, a key of a keyboard musical instrument. Thus, manipulation of an operator involves, for example, pressing or releasing the key by a user. The phrase "manipulation amount" refers to an amount of movement of the operator caused by manipulation by the user, e.g., a depth to which the operator is depressed. The phrase "manipulation intensity" refers to an intensity of manipulation of the operator, and is typically an amount of pressure exerted on the operator under a manipulation by the user (e.g., an amount of pressure exerted on a key).

The description "a chord including a root note pitch determined based on a manipulation amount or a manipulation intensity of each of two or more operators" means that if manipulation of a combination of the two or more operators common to a chord, but an amount or intensity of manipulation of the operators differs, the resulting identified chord will be different.

In an example (Aspect 2) of Aspect 1, the manipulation analyzer is configured to identify a chord that includes as the root note pitch a note pitch that corresponds to an operator with a greatest manipulation amount among the two or more operators. Users tend to more strongly manipulate an operator that corresponds to a root note pitch of a chord. In the above-described aspect, a note pitch that corresponds to an operator with a greatest manipulation amount among the two or more operators is determined as the root note pitch, which enables accurate identification of a chord including the root note pitch intended by the user.

In an example (Aspect 3) of Aspect 1, the manipulation analyzer is configured to identify a chord that includes as the root note pitch a note pitch that corresponds to an operator with a highest manipulation intensity among the two or more operators. Users tend to more strongly manipulate an operator that corresponds to a root note pitch of a chord. In the above-described aspect, a note pitch that corresponds to an operator with the highest manipulation intensity from among the two or more operators is determined as the root note pitch, which allows for accurate identification of a chord including the root note pitch played by the user.

In an example (Aspect 4) of Aspect 1, the manipulation analyzer is configured to identify the chord by inputting, into a trained model, input data including the manipulation amount or the manipulation intensity of each of the two or more operators, manipulation of which is detected by the manipulation detector, wherein the trained model has learned relationships between: manipulation amounts or manipulation intensities for each of two or more operators; and chords. According to the above configuration, compared with a configuration in which a chord is identified only from a combination of two or more operators manipulation of which by the user is detected, it is possible to accurately identify a chord by taking into account a difference in a root note pitch. The trained model is a statistical estimation model established by machine learning, for example.

A keyboard musical instrument according to one aspect of the present disclosure (Aspect 5) includes a music keyboard that includes a plurality of keys each of which corresponds to a different note pitch; a manipulation detector configured to detect manipulation by a user of each of the plurality of keys; a playback controller configured to cause a playback device to play a music sound of a note pitch that corresponds, from among the plurality of keys, to a key, manipulation of which is detected by the manipulation detector; and a manipulation analyzer configured to identify a chord that corresponds, from among the plurality of keys, to a combination of two or more keys, manipulation of which is detected, the chord including a root note pitch that is determined based on a manipulation amount or a manipulation intensity of each of the two or more keys.

An information processing method according to one aspect of the present disclosure (Aspect 6) includes: detecting manipulation by a user of each of a plurality of operators each of which corresponds to a different note pitch; and identifying a chord that corresponds from among the plurality of operators to a combination of two or more operators, manipulation of which is detected, the chord including a root note pitch that is determined based on a manipulation amount or a manipulation intensity of each of the two or more operators.

A program according to one aspect of the present disclosure (Aspect 7) causes a computer to function as a manipulation detector configured to detect manipulation by a user of each of a plurality of operators, each of which corresponds to a different note pitch; and a manipulation analyzer configured to identify a chord that corresponds from among the plurality of operators to a combination of two or more operators, manipulation of which is detected, the chord including a root note pitch that is determined based on a manipulation amount or a manipulation intensity of each of the two or more operators.

DESCRIPTION OF REFERENCE SIGNS

100 . . . keyboard musical instrument, 10 . . . music keyboard, 12 . . . keys, 20A, 20B . . . detection device, 30 . . . information processing system, 31 . . . control device, 32 . . . storage device, 40 . . . playback device, 41 . . . sound source device, 42 . . . sound output device, 50 . . . display device, 61A, 61B . . . manipulation detector, 62 . . . playback controller, 63A, 63B, 63C . . . manipulation analyzer, 64 . . . learning processor

What is claimed:

1. An information processing system for a keyboard musical instrument including a plurality of keys each corresponding to a different note pitch, the information processing system comprising:
- one or more memories storing instructions; and
- one or more processors communicatively connected to the one or more memories and that execute the stored instructions to:
  - acquire a detection signal corresponding to each manipulated key, among the plurality of keys, that has been manipulated by a user, wherein each of the plurality of keys is physically displaceable;
  - determine a manipulation amount or intensity of each of the plurality of keys based on the acquired detection signal, wherein:
    - the manipulation amount is an amount of physical displacement of the key caused by the user manipulating the key, and
    - the manipulation intensity is an intensity of the user manipulating the key; and
  - determine a chord that corresponds, from among the plurality of keys, to a combination of detected two or more keys manipulated by the user, the determining of the chord including determining a pitch of a root note included in the chord based on the manipulation amount or intensity of each of the detected two or more manipulated keys.

2. The information processing system according to claim 1, wherein the one or more processors, in determining the chord, determine the pitch of the root note from a manipulated key, among the detected two or more manipulated keys, with a greatest manipulation amount.

3. The information processing system according to claim 1, wherein the one or more processors, in determining the chord, determine the pitch of the root note from a manipulated key, among the detected two or more manipulated keys, with a highest manipulation intensity.

4. The information processing system according to claim 1, wherein:
- the one or more processors, in determining the chord, input, into a trained model, input data including the manipulation amount or intensity of each of the detected two or more manipulated keys, and
- the trained model has learned relationships between:
  - manipulation amounts or intensities for each of two or more keys; and
  - chords.

5. A keyboard musical instrument comprising:
- a music keyboard that includes a plurality of keys each corresponding to a different note pitch, wherein each of the plurality of keys is physically displaceable;
- one or more memories storing instructions; and
- one or more processors communicatively connected to the one or more memories and that execute the stored instructions to:
  - acquire a detection signal corresponding to each manipulated key, among the plurality of keys, that has been manipulated by a user;
  - determine a manipulation amount or intensity of each of the plurality of keys based on the acquired detection signal, wherein:
    - the manipulation amount is an amount of physical displacement of the key caused by the user manipulating the key, and
    - the manipulation intensity is an intensity of the user manipulating the key;
  - cause a playback device to play a music sound of a note pitch corresponding to, from among the plurality of keys, each detected manipulated key; and
  - determine a chord that corresponds, from among the plurality of keys, to a combination of detected two or more keys manipulated by the user, the determining of the chord including determining a pitch of a root note included in the chord based on the manipulation amount or intensity of each of the detected two or more manipulated keys.

6. The keyboard musical instrument according to claim 5, wherein the one or more processors, in determining the chord, determine the pitch of the root note from a manipulated key, among the detected two or more manipulated keys, with a greatest manipulation amount.

7. The keyboard musical instrument according to claim 5, wherein the one or more processors, in determining the chord, determine the pitch of the root note from a manipulated key, among the detected two or more manipulated keys, with a highest manipulation intensity.

8. The keyboard musical instrument according to claim 5, wherein:

the one or more processors, in determining the chord, input, into a trained model, input data including the manipulation amount or intensity of each of the detected two or more manipulated keys, and the trained model has learned relationships between:

manipulation amounts or intensities for each of two or more keys; and chords.

9. A computer-implemented information processing method for a keyboard musical instrument including a plurality of keys each corresponding to a different note pitch, the information processing method comprising:

determining a manipulation amount or intensity of each of the plurality of keys based on a detection signal corresponding to, among the plurality of keys, that has been manipulated by a user, wherein:

each of the plurality of keys is physically and mechanically displaceable;

the manipulation amount is an amount of physical displacement of the key caused by the user manipulating the key, and the manipulation intensity is an intensity of the user manipulating the key; and determining a chord that corresponds, from among the plurality of keys, to a combination of detected two or more keys manipulated by the user, the determining of the chord including determining a pitch of a root note included in the chord based on the manipulation amount or intensity of each of the detected two or more manipulated keys.

10. The information processing method according to claim 9, wherein the determining of the chord determines the pitch of the root note from a manipulated key, among the detected two or more manipulated keys, with a greatest manipulation amount.

11. The information processing method according to claim 9, wherein the determining of the chord determines the pitch of the root note from a manipulated key, among the detected two or more manipulated keys, with a highest manipulation intensity.

12. The information processing method according to claim 9, wherein:

the determining of the chord inputs, into a trained model, input data including the manipulation amount or intensity of each of the detected two or more manipulated keys, and the trained model has learned relationships between:

manipulation amounts or intensities for each of two or more keys; and chords.

* * * * *